(12) United States Patent
Shaw et al.

(10) Patent No.: US 9,379,528 B2
(45) Date of Patent: Jun. 28, 2016

(54) CABLE TRAY SERVICE TROLLEY

(71) Applicant: Reliance Industries, LLC, Wheat Ridge, CO (US)

(72) Inventors: Wiley Joe Shaw, Marshall, TX (US); Gary E. Choate, Denver, CO (US)

(73) Assignee: RELIANCE INDUSTRIES, LLC, Wheat Ridge, CO (US)

( * ) Notice: Subject to any disclaimer, the term of this patent is extended or adjusted under 35 U.S.C. 154(b) by 167 days.

(21) Appl. No.: 14/094,371

(22) Filed: Dec. 2, 2013

(65) Prior Publication Data

US 2014/0150687 A1 Jun. 5, 2014

Related U.S. Application Data

(60) Provisional application No. 61/732,341, filed on Dec. 1, 2012.

(51) Int. Cl.
| *H02G 1/00* | (2006.01) |
| *H02G 3/04* | (2006.01) |
| *H02G 1/06* | (2006.01) |

(52) U.S. Cl.
CPC .............. *H02G 3/0456* (2013.01); *H02G 1/06* (2013.01)

(58) Field of Classification Search
CPC ........ H02G 3/0456; H02G 1/06; B61B 13/00; B61D 15/08
USPC ....................................................... 280/32.6
See application file for complete search history.

(56) References Cited

U.S. PATENT DOCUMENTS

| | | | |
|---|---|---|---|
| 1,327,103 A | 1/1920 | Knowles | |
| 1,538,437 A | 5/1925 | Larsen | |
| 3,044,797 A * | 7/1962 | Borland | ............... A61G 5/00 |
| | | | 280/32.6 |
| 3,770,233 A | 11/1973 | McElroy | |
| 4,050,561 A | 9/1977 | Seitz | |
| 4,185,846 A | 1/1980 | Black | |
| 4,771,699 A | 9/1988 | Kaiserfeldt | |
| 4,895,380 A * | 1/1990 | Brooks | ................ B25H 5/00 |
| | | | 280/32.6 |
| 5,042,756 A | 8/1991 | Pratt, Jr. | |
| 5,050,705 A | 9/1991 | Natwick | |
| 5,299,826 A | 4/1994 | Flowers | |
| 5,397,139 A * | 3/1995 | Simpson | ................ B25H 5/00 |
| | | | 280/32.6 |
| 5,465,929 A | 11/1995 | Dooley | |
| RE35,732 E * | 2/1998 | Shockley | ............... B25H 5/00 |
| | | | 135/88.05 |
| 5,730,398 A | 3/1998 | Shimizu | |

(Continued)

*Primary Examiner* — Jason C Smith
(74) *Attorney, Agent, or Firm* — Polster, Lieder, Woodruff & Lucchesi

(57) ABSTRACT

A cable tray trolley having a cushioned body configured to support a human, a frame configured to support the body and wheels that roll atop the rails of a cable tray to enable the trolley to travel along the length of the cable tray, the cable tray supporting the trolley. The trolley has adjustable torso and pelvic cushions and an adjustable leg support. The trolley also comprises a brake mechanism to slow or stop the travel of the trolley along the length of the cable tray. The trolley wheels are attached to the frame with adjustable shafts to enable the trolley to fit cable trays of varying widths.

24 Claims, 4 Drawing Sheets

(56) References Cited

U.S. PATENT DOCUMENTS

| | | | |
|---|---|---|---|
| 5,730,449 A * | 3/1998 | Miles | B25H 5/00 280/32.5 |
| 5,735,214 A | 4/1998 | Tsuboi | |
| 6,076,838 A * | 6/2000 | Peterson | B25H 5/00 188/5 |
| RE37,372 E | 9/2001 | Smith | |
| 6,644,601 B2 | 11/2003 | Aussiker | |
| 6,871,861 B2 * | 3/2005 | Hernandez, Jr. | B25H 5/00 248/129 |
| 7,363,864 B2 | 4/2008 | Broek | |
| 7,374,181 B1 * | 5/2008 | Wu | B25H 5/00 280/32.5 |
| 7,857,099 B2 | 12/2010 | Choate | |
| 8,573,607 B2 * | 11/2013 | Meacham | B25H 5/00 104/97 |
| 9,126,325 B1 * | 9/2015 | Meacham | B25H 5/00 |
| 2005/0051048 A1 * | 3/2005 | Broek | B25H 5/00 104/106 |
| 2006/0186619 A1 * | 8/2006 | Sieb | B25H 5/00 280/32.6 |
| 2007/0013154 A1 * | 1/2007 | Staples | B25H 5/00 280/32.6 |
| 2007/0235960 A1 * | 10/2007 | Pantaleoni | B25H 5/00 280/32.6 |
| 2008/0012252 A1 * | 1/2008 | Hernandez | B25H 5/00 280/32.6 |
| 2008/0093810 A1 * | 4/2008 | Liu | B25H 5/00 280/32.6 |
| 2008/0157492 A1 * | 7/2008 | Chaykin | B25H 5/00 280/32.6 |
| 2011/0120341 A1 * | 5/2011 | Kelly | A61G 3/0808 104/287 |
| 2011/0227303 A1 * | 9/2011 | Gering | B25H 5/00 280/32.6 |
| 2012/0091673 A1 * | 4/2012 | Meacham | B25H 5/00 280/32.6 |
| 2012/0139198 A1 * | 6/2012 | Wang | B25H 5/00 280/32.6 |
| 2012/0235371 A1 * | 9/2012 | Smith | B25H 5/00 280/32.6 |
| 2014/0150687 A1 * | 6/2014 | Shaw | H02G 3/0456 105/329.1 |
| 2014/0232075 A1 * | 8/2014 | Whiteside | B25H 5/00 280/32.6 |
| 2014/0339783 A1 * | 11/2014 | Dall'Armi | B25H 5/00 280/32.6 |
| 2015/0084293 A1 * | 3/2015 | Huang | B60Q 1/24 280/32.6 |

* cited by examiner

CABLE TRAY SERVICE TROLLEY

CROSS REFERENCE TO RELATED APPLICATIONS

This application derives and claims priority from U.S. provisional application 61/732,341 filed Dec. 1, 2012, which application is incorporated herein by reference.

STATEMENT REGARDING FEDERALLY SPONSORED RESEARCH OR DEVELOPMENT

Not applicable.

BACKGROUND OF THE INVENTION

This invention relates generally to a device or system for transporting an individual on a trolley or cart along a cable tray for maintenance or servicing of the cable tray utilities and equipment associated with the cable tray, as well as accessing and servicing locations along the route of the service tray, and more particularly to a unique trolley or cart that is configured to be supported by and travel along the cable tray.

Cable trays are elongated scaffolds that are designed and commonly used for routing of wiring, plumbing and other such utilities in elevated settings, and throughout buildings and other facilities for various applications. In many applications, cable tray systems are quite extensive and weave throughout one or more structures, in and out of tunnels and gaps, and through various openings. Often, cable trays are elevated and may be located behind by walls or equipment. Consequently, portions of cable tray systems are often very difficult to access. This can be a significant problem when the utilities carried by the cable trays or associated equipment require inspection, maintenance and/or repairs in the vicinity of a portion of a cable tray that is difficult to access.

It would therefore be desirable to have a device that would provide an individual relatively convenient access along the length of a cable tray. The individual could then readily conduct inspections, and perform maintenance and repairs to the utilities or equipment carried by the cable trays. The individual would also have the ability to perform similar functions on equipment or facilities positioned along, but not carried by, the cable tray.

As will become evident in this disclosure, the present invention provides benefits over the existing art.

SUMMARY OF THE INVENTION

It has been discovered that the problems left unanswered by known art can be solved by providing a trolley or cart that uses the structure of cable trays to support a person, and allow that person to travel along a cable tray.

An example of the invention includes extendable axles that can be mounted on cable trays of different widths, and allow the trolley to be used along a variety of styles of cable trays. The extendible axles also provide support for the user's feet, and can be adjusted forward and aft to accommodate different sized individuals in a comfortable position.

A preferred example of the invention provides a braking mechanism that allows the user to control the speed of movement or allow the user to restrain the device, so that the user may safely perform maintenance work without risk of unintended travel of the trolley.

Still further, a highly preferred example of the invention allows for adjustment of the position of the user's torso, and thus allow the user to lean forward or back as required for clearing obstacles or for assuming a comfortable working posture.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

BRIEF DESCRIPTION OF THE DRAWINGS

The illustrative embodiments of the present invention are shown in the following drawings which form a part of the specification.

Corresponding reference characters indicate corresponding parts throughout the several views of the drawings.

DETAILED DESCRIPTION

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
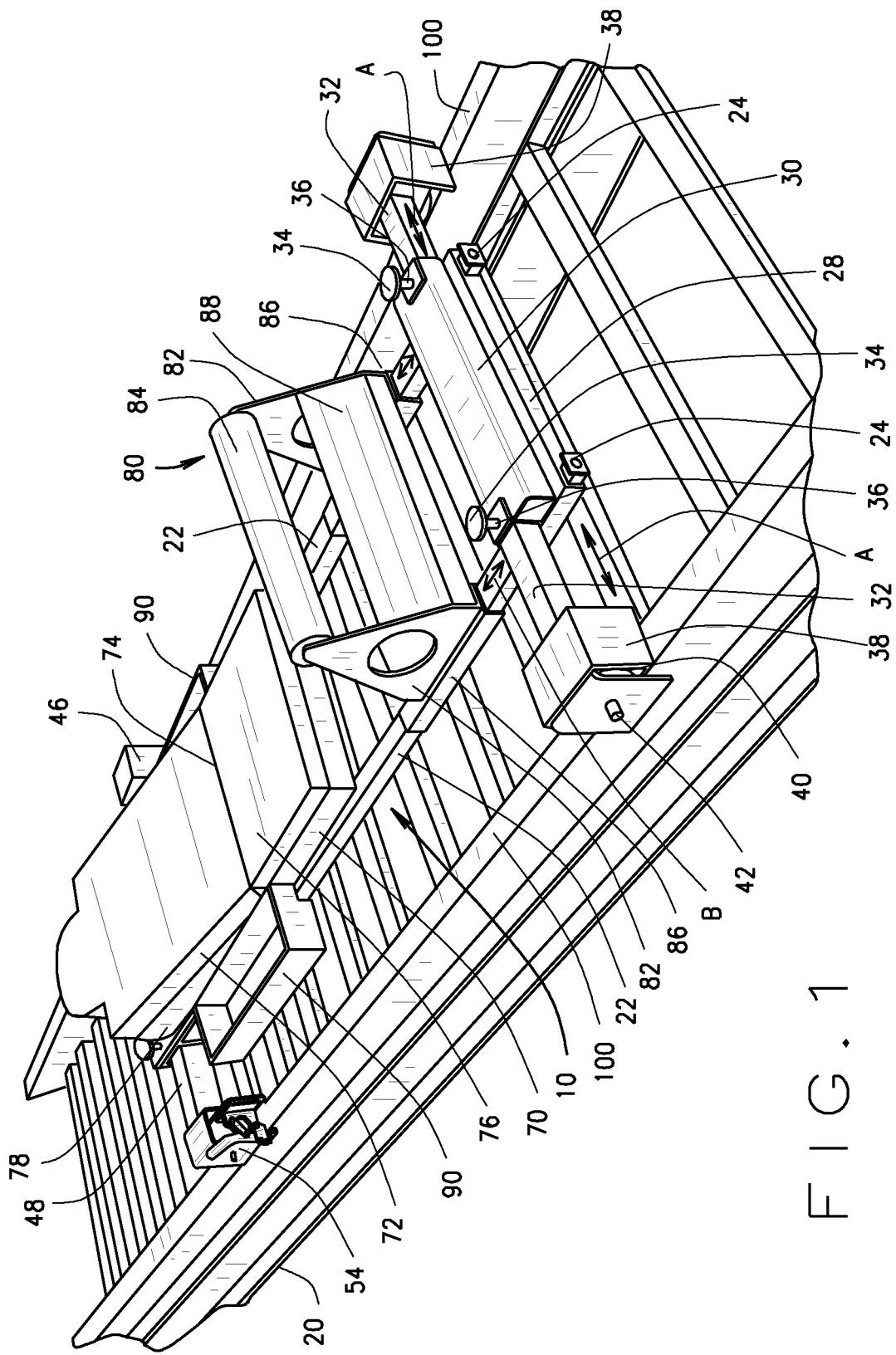
FIG. 1 is a perspective view of a cable tray trolley incorporating one embodiment of the present invention and positioned on a section of cable tray.
Figure 2:
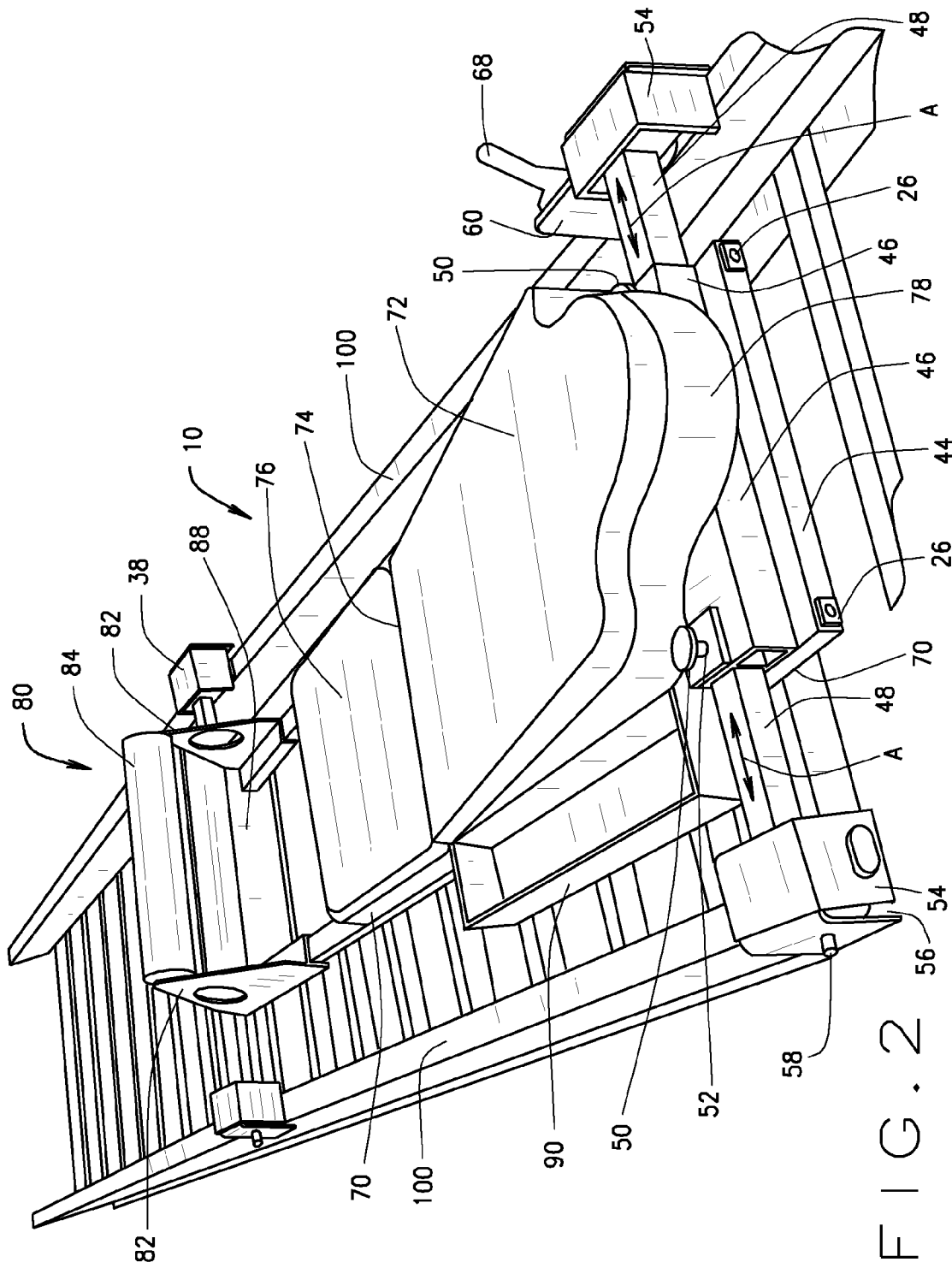
FIG. 2 is another perspective view of the cable tray trolley of FIG. 1.
Figure 3:
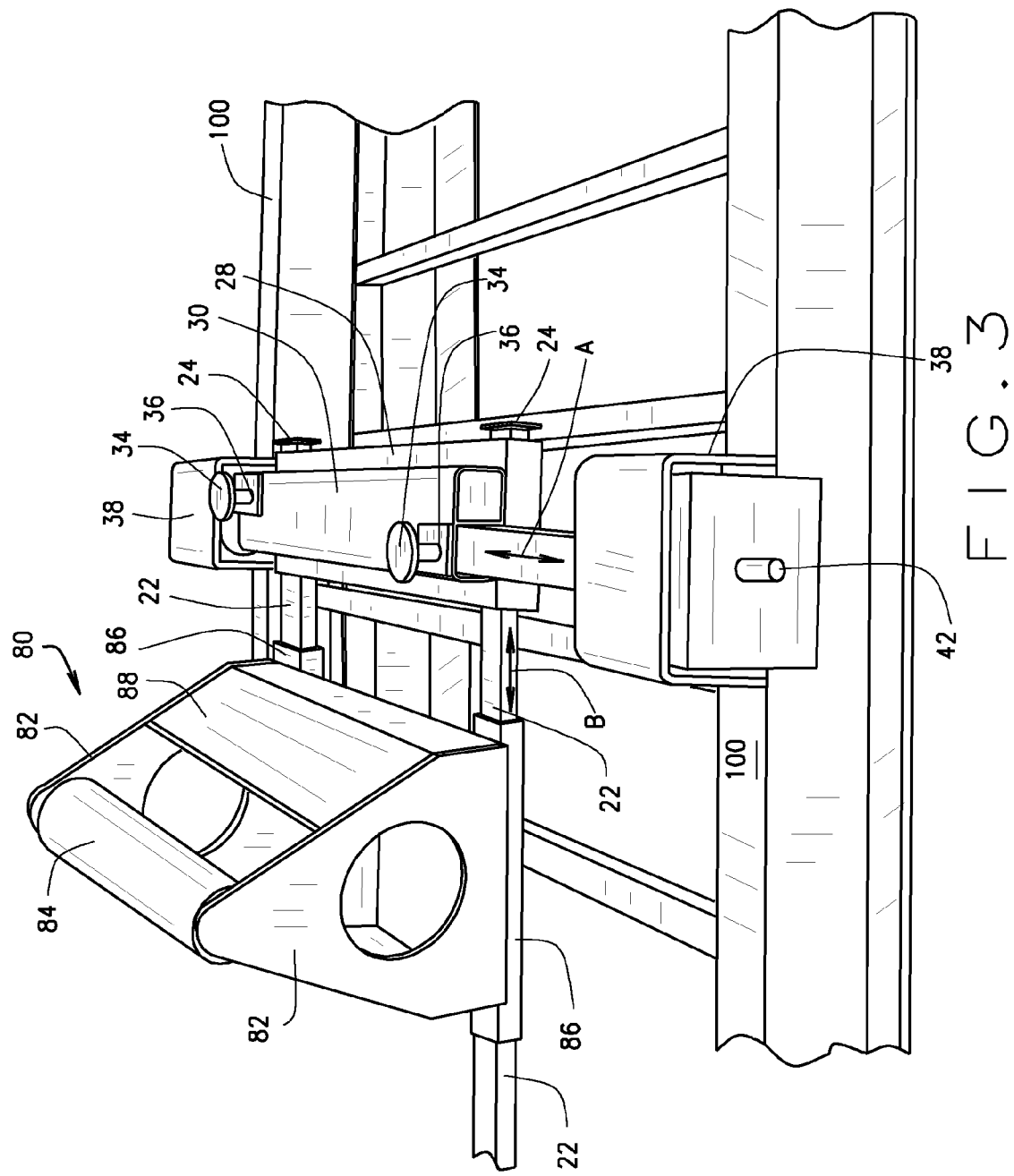
FIG. 3 is a perspective view of one end of the cable tray trolley of FIG. 1.

In referring to the drawings, an embodiment of the novel cable tray trolley is shown generally at 10 in FIGS. 1-4, where the present invention is depicted by way of example mounted atop a section of cable tray 20. As can be seen, the trolley 10 includes a pair of generally horizontal and parallel side rails 22 positioned approximately eighteen inches apart from each other. The side rails 22 are of uniform length and have matching proximal ends 24 and distal ends 26 (FIG. 2). The side rails 22 both have identical rectangular cross-sections of substantially uniform dimension along their entire lengths.

At the proximal ends 24 of the side rails 22, an elongated rectangular cross-brace 28 spans perpendicularly between and is securely mounted to both of the side rails 22. A hollow, elongated rectangular tube 30 is securely attached atop the cross-brace 28. The tube 30 has two channels. As can be seen, the tube 30 runs the entire length of the cross-brace 28, but is slightly smaller in width. A pair of extendable rectangular shafts 32 are positioned within and extend outward from each end of the tube 30. The shafts 32 are shaped and sized to fit snugly within the tube 30 such that the shafts 32 have very limited freedom of movement within the tube 30, are unable to rotate within the tube 30, but can be moved into and extend out of the tube 30 to varying lengths. Not unlike a square channel trailer hitch, this configuration of the tube 30 and the shafts 32 provides a very robust support to the cantilevered portion of the shafts 32 that extend outward from the tube 30.

A pair of hand-turnable machine-thread set screws 34 are screwed into threaded holes 36 on the top of and near each end of the tube 30. The set screws 34 are used to tighten down on the shafts 32 when positioned in the tube 30 to secure the shafts 32 to a desired position.

The shafts 32 each extend collinearly outward from the tube 30 to attach to a complementary pair of box-shaped wheel housings 38. Each wheel housing 38 is open along its underside and houses a wheel 40 that is mounted inside the housing 38 to an axle 42 that protrudes outside the housing 38 opposite the shaft 32. The wheels 40 are configured to rotate on the axle 42 about a mutual axis that is perpendicular to the side rails 22. The wheels 40 each rest upon and are configured to roll atop one of two rails 100 of the cable tray 20.

At the distal ends 26 of the side rails 22 (FIG. 2), an elongated rectangular cross-brace 44 spans perpendicularly between and is securely mounted to both of the side rails 22. A hollow, elongated rectangular tube 46 is securely attached atop the cross-brace 44. The tube 46 has two channels. As can be seen, the tube 46 runs the entire length of the cross-brace 44, but is slightly smaller in width. A pair of extendable rectangular shafts 48 are positioned within and extend outward from each end of the tube 46. The shafts 48 are shaped and sized to fit snugly within the tube 46 such that the shafts 48 have very limited freedom of movement within the tube 46, are unable to rotate within the tube 46, but can be moved into and extend out of the tube 46 to varying lengths. Not unlike a square channel trailer hitch, this configuration of the tube 46 and the shafts 48 provides a very robust support to the cantilevered portion of the shafts 48 that extend outward from the tube 46.

A pair of hand-turnable machine-thread set screws 50 are screwed into threaded holes 52 on the top of and near each end of the tube 46. The set screws 50 are used to tighten down on the shafts 48 when positioned in the tube 46 to secure the shafts 46 to a desired position.

The shafts 48 each extend collinearly outward from the tube 46 to attach to a complementary pair of box-shaped wheel housings 54. Each wheel housing 54 is open along its underside and houses a wheel 56 that is mounted inside the housing 54 to an axle 58 that protrudes outside the housing 54 opposite the shaft 48. The wheels 58 are configured to rotate on the axle 58 about a mutual axis that is perpendicular to the side rails 22. The wheels 58 each rest upon and are configured to roll atop one of two rails 100 of the cable tray 20.

Figure 4:
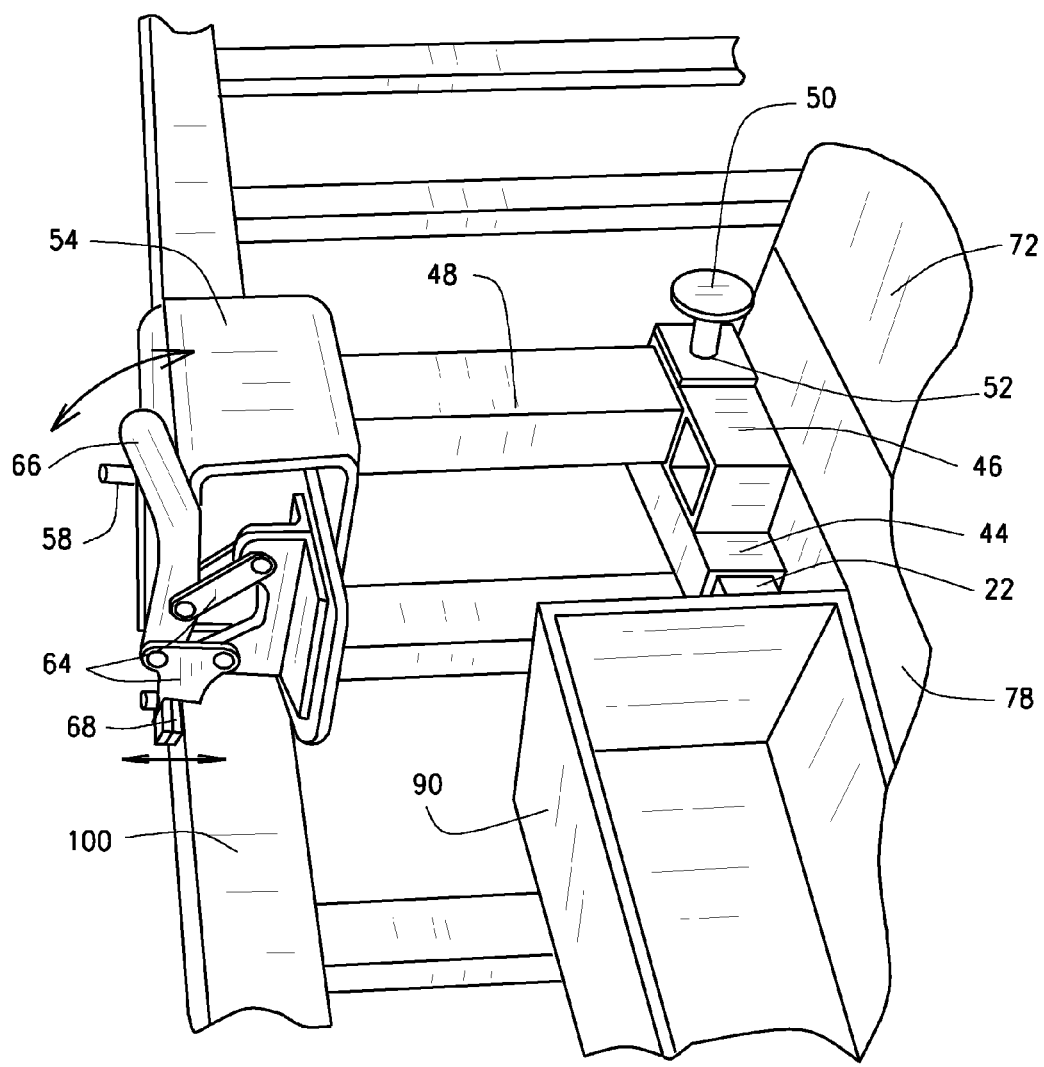
FIG. 4 is a perspective view of brake components of the cable tray trolley of FIG. 1.

Referring to FIG. 4, it can be seen that a first rectangular flange 60 is attached to and extends perpendicularly away from one end of one of the wheel housings 54 in a direction generally parallel to the side rails 22 and directed toward the corresponding wheel housing 38. A second flange 62 extends perpendicularly from the first flange 60 in a direction away from the side rails 22. A set of linkages 64 are rotatably attached at one end to the second flange 62 and attach at the other end to a hand-operated lever 66. A friction brake pad 68 attaches to the bottom of one of the linkages 64 in proximity to the outer edge of the cable tray rail 100 atop which the wheel housing 54 is situated. The flanges 62 and 62, the linkages 64, the lever 66 and the brake pad 68 are all configured and oriented such that when the lever 66 is rotated outward, the brake 68 presses against the cable tray rail 100 to slow or stop the movement of the trolley 10 along the cable tray 20. In addition, the flanges 62 and 62, the linkages 64, the lever 66 and the brake pad 68 are all configured and oriented such that the brake pad 68 can be locked in a position that engages the side rail 22, and thus prevents movement of the trolley 10 along the cable tray 20, by fully rotating the lever 66 downward.

Referring again to FIGS. 1 and 2, a generally horizontal and rectangular platform 70 spans across and is rigidly secured to the top surfaces of the side rails 22 near the distal ends 26. The combination of the side rails 22 and the platform 70 form a rigid frame for the trolley 10.

A torso cushion 72 with a lower edge 74, and a pelvic cushion 76, are both securely mounted atop the platform 70. The pelvic cushion 76 substantially abuts the lower 74 of the torso cushion 72, and together with the torso cushion 72 form a comfortable rest atop the trolley 10 for a user. Preferably, the torso cushion 72 is configured to rotate about its lower edge 74 to allow a user to tilt the torso cushion 72 relative to the pelvic cushion 76 to provide a comfortable working position for the user or to clear overhead obstacles during utilization of the trolley 10. The torso cushion 72 can be rotationally attached to the pelvic cushion 76 along the lower edge 74. Optionally, an angular support cushion 78 can be placed under the torso cushion 72 to position the torso cushion 72 at a desired position.

A leg support 80 spans across and is removably mounted atop the side rails 22 opposite the platform 70 and near the side rail proximal ends 24. The leg support 80 has a pair of upright and generally parallel triangular side plates 82 that support a padded cylindrical rod 84 above the height of the pelvic cushion 76. A pair of equal-length and parallel inverted rail channels 86 are mounted to the underside of each end of the leg support 80. The channels 86 are sized and shaped to fit closely over the side rails 22. The channels 86 have identical U-shaped cross-sections of substantially uniform dimension along their entire lengths. Because the channels 86 are shorter than the side rails 22, the channels 86, and accordingly the leg support 80, can slide along the length of the side rails 22 between the proximal ends 24 and the platform 70 as indicated by arrow B to enable linear adjustment to the leg support 80 to provide comfort for a user. Of course, it is contemplated that in alternate embodiments the leg support 80 may include set screws, pins or other such locking mechanisms to secure the leg support 80 in a desired location along the side rails 22.

A cross-plate 88 spans between and is attached at each end to the side plates 82. The cross-plate 88 is shaped to match the contours of the base and lower half of each of the side plates 82. Thus, the cross-plate 88 and the side plates 82 form a container within the leg support 80 for carrying or storage. As can be appreciated, the leg support 80 places the user's legs in a raised position, which adds comfort and avoids fatigue and circulatory problems by raising the legs to a level above the carry tray 20 that is at about the same as the level for the user's heart and lung area. In addition, it is anticipated that when the user is traveling on the trolley 10, the user's body will be facing downward on the pelvic and torso cushions 72 and 76. When the user is in this position, the leg support 80 raises the user's feet above the height of the cable tray 20 to prevent the user's feet and toes from engaging or dragging on the cable tray 20 or associated utilities or equipment as the trolley 10 travels along the cable tray 20.

In addition, a pair of elongated and generally rectangular tool trays 90 are attached to the each side of the platform 70 to provide convenient carrying capacity and storage.

It will be understood that the disclosed extendable shafts 32 and 48 enable the cable tray trolley 10 to fit atop a wide variety of cable trays 20 of varying widths by positioning the wheels 40 and 58 directly over the cable tray rails 100. In order to do so, the wheel housings 38 and 46 are extended telescopically and secured in the desired position by tightening the set screws 34 and 50. Hence, the extendable shafts 32 and 48 allow inboard and outboard adjustment of the wheels 32, as indicated by arrows A. The wheels 40 and 58 are preferably located on each of the four corners of the cable tray trolley 10, as disclosed in the present embodiment.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel cable tray trolley 10 of the present invention can be arranged in a number of other and related varieties of configurations without departing from or expanding beyond the scope of my invention as set forth in the claims.

For example, the trolley 10 may comprise a propulsion device to propel the trolley 10 along atop the cable tray rails 100. The propulsion device may, for example, be an electric motor. An embodiment of the trolley 10 with an electric motor may also comprise a battery operatively associated with the electric motor to store electric energy to drive the electric motor. In addition, such an embodiment may further comprise a system to draw energy from the cable tray to drive the electric motor and/or to charge the battery. The trolley 10 may also comprise a variable rheostat controller or other similar device, powered by the battery, to control the operation of the electric motor for forward travel and braking. The trolley 10 can also be coated with dielectric or other insulative coatings for use of the trolley 10 in areas have electrified fields. Further, as a safety feature, optional travel stops may be incorporated in or on the cable tray 20, and corresponding stopping components, such as for example bumpers, can be placed on the trolley 10 to limit or prevent travel of the trolley 10 into hazardous or otherwise undesirable areas.

Moreover, and by way of further example, the trolley 10 need not be configured to ride atop the cable tray 20, but may be configured to travel alongside the cable tray 20, be suspended from the cable tray 20, or otherwise travel along the underside of the cable tray 20. Also, the trolley 10 is not restricted to having exactly four wheels 40 and 56. Rather, the trolley 10 may have any quantity and combination of wheels 40 and 56 so long as they enable or assist the trolley 10 in traveling along the rails 100 of the cable tray 20. In addition, it is recognized that a wide variety of one or more wheels or combinations of various other devices such as rollers, bearings or slides may be utilized to enable the trolley 10 to move along the cable tray 20. Similarly, and by way of further example, the shafts 32 and 48 need not be adjustable within the tubes 30 and 46, but can be rigidly affixed, and the shafts 32 and 48 need not be square in cross-section, but may have oval, round or other cross-section. Still further by example, the trolley 10 is not required to have a braking system at all, nor a braking system with the exact same components of the flanges 62 and 62, the linkages 64, the lever 66 and the brake pad 68, but may more than one system or may have any variety of configuration of differing components to comprise a brake or braking system so long as the system serves to slow, stop or otherwise impede the travel of the trolley 10 along the rails 100.

Additional variations or modifications to the configuration of the novel cable tray trolley 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

What is claimed is:

1. A trolley for a cable tray, the cable tray having an elongated base and a first side rail and a second side rail, the first and second side rails being substantially parallel and running along opposite sides of the base, the trolley comprising:
   a. a body configured to support a human, the body having a first side and a second side opposite the first side; and
   b. a frame configured to operatively interface with the cable tray rails to support the body above the cable tray, the cable tray supporting the frame the frame engaging the cable tray such that the trolley is able to travel along the length of the cable tray;
   wherein the first side of the body is separated from the first rail by a first gap, the first gap being wide enough for a human arm to reach through to the cable tray base below the trolley.

2. The trolley of claim 1, further comprising a first roller attached to the frame, the roller configured to interface with and roll along the cable tray first rail to at least in part support the frame.

3. The trolley of claim 2, wherein the first roller comprises a wheel.

4. The trolley of claim 2, further comprising a plurality of rollers attached to the frame and configured to at least in part support the frame, the plurality of rollers configured to roll along the first and second side rails of the cable tray.

5. The trolley of claim 4, wherein at least one of the plurality of rollers is attached to the frame by an extendable shaft.

6. The trolley of claim 5, wherein the body is attached to the extendable shaft such that the cap between the first side of the body and the first side rail is adjustable.

7. The trolley of claim 1, wherein the body comprises a seat.

8. The trolley of claim 1, wherein the frame comprises a first lateral side and a second lateral side opposite the first lateral side, the first lateral side engaging the first side rail of the cable tray, the body being movably attached to the frame so as to allow for selectable positioning of the body on the frame between the first and second lateral sides of the frame.

9. The trolley of claim 8, further comprising a locking mechanism to releasable secure the body in a desired position on the frame between the first and second lateral sides of the frame.

10. The trolley of claim 8, wherein the body is slidably attached to the frame so as to allow for slidable positioning of the body on the frame between the first and second lateral sides of the frame.

11. The trolley of claim 1, wherein the second side of the body is separated from the second rail by a second gap, the second gap being wide enough for a human arm to reach through to the cable tray base below the trolley.

12. The trolley of claim 11, wherein the leg rest comprises a storage tray.

13. The trolley of claim 1, wherein the frame is adjustable in length.

14. The trolley of claim 1, further comprising a leg rest positioned atop the body, the body having an upper surface and a lower surface opposite the upper surface, the leg rest having a height above the body sufficient to raise the feet of a person lying on the body above the lower surface of the body.

15. The trolley of claim 14, wherein the leg rest is configured to be releasably secured to the frame in more than one position.

16. The trolley of claim 1, further comprising a storage tray.

17. The trolley of claim 1, further comprising a brake configured to operatively interface with the cable tray to impede the movement of the trolley along the length of the cable tray.

18. In combination with a cable tray having an elongated base and a first side rail and a second side rail, the first and second side rails being substantially parallel and running above opposite longitudinal sides of the base, a trolley comprising:
 a. a body configured to support a human, the body having a first side and a second side opposite the first side, the body having a width defined by the distance between said first and second sides;
 b. a frame configured to support the body, the frame having a first lateral side and a second lateral side opposite the first lateral side with a width defined by the distance between the first and second lateral sides, the width of the frame being greater than the width of the body and forming a first gap between the frame and the body along said first lateral side, the first gap being wide enough for a human arm to reach through to the cable tray below the trolley;
 c. a first plurality of extendable rollers attached to and supporting the first lateral side of the frame, said first plurality of extendable rollers adapted to adjustably extend outward laterally from the frame to engage and roll along the first side rail of the cable tray; and
 d. a second plurality of extendable rollers attached to and supporting the second lateral side of the frame, said second plurality of extendable rollers adapted to adjustably extend outward laterally from the frame to engage and roll along the second side rail of the cable tray.

19. The combination of claim 18, wherein the body movably attaches to the frame so as to allow for selectable lateral positioning of the body on the frame between the first and second lateral sides of the frame.

20. The combination of claim 19, wherein the body is releasably securable to the frame at a desired position on the frame between the first and second lateral sides.

21. The combination of claim 19, wherein the body is slidably attached to the frame so as to allow for slidable positioning of the body on the frame between the first and second lateral sides of the frame.

22. The combination of claim 18, wherein the second side of the body is separated from the second lateral side of the frame by a second gap, the second gap being wide enough for a human arm to reach through to the cable tray below the trolley.

23. The combination of claim 18, further comprising a first extendable arm attaching one of said first plurality of extendable rollers to the frame.

24. The combination of claim 23, further comprising a second extendable arm attaching one of said second plurality of extendable rollers to the frame.

* * * * *